US012580423B2

(12) United States Patent
Yang et al.

(10) Patent No.: US 12,580,423 B2
(45) Date of Patent: Mar. 17, 2026

(54) FOREIGN OBJECT DETECTION APPARATUS AND METHOD

(71) Applicant: Huawei Digital Power Technologies Co., Ltd., Shenzhen (CN)

(72) Inventors: Songnan Yang, Frisco, TX (US); Donghao Wu, Shenzhen (CN); Xiaoqing Hu, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 907 days.

(21) Appl. No.: 17/643,465

(22) Filed: Dec. 9, 2021

(65) Prior Publication Data

US 2022/0103021 A1 Mar. 31, 2022

Related U.S. Application Data

(63) Continuation of application No. PCT/US2019/045471, filed on Aug. 7, 2019.

(51) Int. Cl.
*H02J 50/60* (2016.01)
*H02J 50/12* (2016.01)

(52) U.S. Cl.
CPC ............. *H02J 50/60* (2016.02); *H02J 50/12* (2016.02)

(58) Field of Classification Search
CPC .. H02J 50/60; H02J 50/80; H02J 50/12; H02J 50/40; H02J 50/10; H02J 50/402; H02J 50/90; H02J 50/20; H02J 7/00045; H02J 7/02; H02J 50/15; H02J 50/50; H02J 50/70; H02J 7/00034; H02J 50/005; H04B 5/263; H04B 5/48; H04B 5/79; H04B 5/266; H04B 5/73; G01R 27/2611; G01R 27/26; B60L 53/122
USPC .................................................. 320/108–115
See application file for complete search history.

(56) References Cited

U.S. PATENT DOCUMENTS

| | | | | |
|---|---|---|---|---|
| 9,294,153 B2 * | 3/2016 | Muratov | ............... | H04B 5/266 |
| 10,072,947 B1 | 9/2018 | Mantler | | |
| 2012/0001493 A1 | 1/2012 | Kudo et al. | | |
| 2017/0018977 A1 * | 1/2017 | Van Wageningen | .... | H02J 50/80 |
| 2017/0229926 A1 * | 8/2017 | Oettinger | ............... | H02J 50/80 |
| 2019/0319494 A1 * | 10/2019 | Park | ........................ | H02J 50/60 |
| 2019/0326786 A1 * | 10/2019 | Kim | ........................ | H02J 50/60 |

FOREIGN PATENT DOCUMENTS

| | | |
|---|---|---|
| CN | 101431258 A | 5/2009 |
| CN | 108736588 A | 11/2018 |
| JP | 2009089464 A | 4/2009 |

* cited by examiner

*Primary Examiner* — Binh C Tat
(74) *Attorney, Agent, or Firm* — Slater Matsil, LLP

(57) ABSTRACT

A method includes performing a power loss calibration on a wireless power transfer system, enabling a wireless power transfer on the wireless power transfer system, calculating a power loss of the wireless power transfer system based on the power loss calibration, measuring a coupling factor between a transmitter coil and a receiver coil of the wireless power transfer system, and determining whether to continue the wireless power transfer of the wireless power transfer system based on the calculated power loss and the measured coupling factor.

15 Claims, 7 Drawing Sheets

302 — Q FACTOR DETECTION

304 — FO DETECTED?

NO

YES

306 — CARRY OUT A DC VALUE BASED CALIBRATION

308 — MEASURE AND RECORD TRANSMITTER AND RECEIVER COUPLING FACTOR

310 — START POWER TRANSFER

MEASURE AND CALCULATE Ploss AND K

312

Ploss>Plossth?

YES

314

NO

|K-Kth|>ΔK?

NO

316 YES

REPORT FO

318

320 — PAUSE POWER TRANSFER

402

406     404

0          25          50 (mm)

Cr

M12

Irect

Cp

504

ITX

M23

502

Cd     +

506

Vd

M13     −

FOREIGN OBJECT DETECTION APPARATUS AND METHOD

CROSS-REFERENCE TO RELATED APPLICATIONS

This application is a continuation of Application No. PCT/US2019/045471, filed on Aug. 7, 2019, which application is hereby incorporated herein by reference in its entirety.

TECHNICAL FIELD

The present disclosure relates to a method for detecting a foreign object in a wireless power transfer system, and, in particular embodiments, to a foreign object detection method in consideration with a relative position change between a transmitter coil and a receiver coil of the wireless power transfer system.

BACKGROUND

As technologies further advance, wireless power transfer has emerged as an efficient and convenient mechanism for powering battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver. The primary side transmitter is configured to generate an alternating current on the primary side coil to form a varying magnetic field, thereby generating a voltage in the secondary side coil.

The primary side transmitter may comprise a power conversion unit such as a primary side of a power converter. The power conversion unit is coupled to a power source and is capable of converting electrical power to wireless power signals applied to the primary side coil. The secondary side receiver receives the wireless power signals through the secondary side coil and converts the received wireless power signals to electrical power suitable for a load such as the battery pack of a mobile phone.

In a high efficiency wireless power transfer system, energy transferring is intended to occur between the primary side transmitter and the secondary side receiver. Foreign objects placed between or adjacent to the primary side transmitter and the secondary side receiver may cause unnecessary power dissipation, thereby reducing the power transfer efficiency in the wireless power transfer system. As power transfer efficiency has become more important, there may be a need for detecting foreign objects in wireless power transfer systems prior to enabling power transfer between the transmitter and the receiver.

SUMMARY

These and other problems are generally solved or circumvented, and technical advantages are generally achieved, by preferred embodiments of the present disclosure which provide a method for detecting a foreign object in a wireless power transfer system.

In accordance with an embodiment, a method comprises performing a power loss calibration on a wireless power transfer system, enabling a wireless power transfer on the wireless power transfer system, calculating a power loss of the wireless power transfer system based on the power loss calibration, measuring a coupling factor between a transmitter coil and a receiver coil of the wireless power transfer system, and determining whether to continue the wireless power transfer of the wireless power transfer system based on the calculated power loss and the measured coupling factor.

Determining whether to continue the wireless power transfer of the wireless power transfer system based on the calculated power loss and the measured coupling factor comprises comparing the calculated power loss with a predetermined power loss threshold to obtain a power loss comparison result, comparing the measured coupling factor with a predetermined coupling factor threshold to obtain a coupling factor comparison result, and determining whether to continue the wireless power transfer of the wireless power transfer system based on the power loss comparison result and the coupling factor comparison result.

The method further comprises prior to enabling the wireless power transfer on the wireless power transfer system, performing a foreign object test on the wireless power transfer system, measuring a Q factor of the wireless power transfer system, comparing a measured Q factor with a predetermined reference to obtain a Q factor measurement result, and determining that a foreign object exists based on the Q factor measurement result.

The method further comprises prior to comparing the measured coupling factor with the predetermined coupling factor threshold to obtain the coupling factor comparison result, comparing the calculated power loss with the predetermined power loss threshold to obtain the power loss comparison result, and determining that a foreign object exists based on the power loss comparison result.

The method further comprises after comparing the measured coupling factor with the predetermined coupling factor threshold to obtain the coupling factor comparison result, halting the wireless power transfer after the coupling factor comparison result indicates a relative position change between the receiver coil and the transmitter coil.

The coupling factor indicates a position of the receiver coil relative to the transmitter coil.

The method further comprises detecting a relative position between the receiver coil and the transmitter coil using a detection coil, wherein the detection coil and the receiver coil are formed in a printed circuit board, and determining a magnetic coupling between the detection coil and the receiver coil in accordance with the relative position between the receiver coil and the transmitter coil. The magnetic coupling between the detection coil and the receiver coil is approximately equal to zero. The magnetic coupling between the detection coil and the transmitter coil exhibits a monotonic curve in response to different offsets between the transmitter coil and the receiver coil.

In accordance with another embodiment, an apparatus comprises a receiver coil configured to be magnetically coupled to a transmitter coil of a wireless power transfer system, and a detection coil over the receiver coil, the detection coil having a first turn and a second turn, wherein a first magnetic flux through the first turn and a second magnetic flux through the second turn are opposite to each other, and wherein as a result of the first magnetic flux and the second magnetic flux opposite to each other, a magnetic coupling between the receiver coil and the detection coil is appropriately equal to zero.

The apparatus further comprises a peak detector having a first input connected to a first terminal of the detection coil, a second input, and an output connected to the second input of the peak detector, a second terminal of the detection coil being connected to ground, and wherein the output of the peak detector indicates a position of the receiver coil relative to the transmitter coil. The detection coil and the receiver coil are formed in a two-layer printed circuit board, and a central axis of the detection coil is aligned with a central axis of the receiver coil.

In accordance with yet another embodiment, a method comprises performing a coupling factor test to measure a first coupling factor representing a first relative position between a transmitter coil and a receiver coil of a wireless power transfer system, enabling a wireless power transfer on the wireless power transfer system, performing the coupling factor test to measure a second relative position between the receiver coil and the transmitter coil of the wireless power transfer system, and after finding a relative position change between the receiver coil and the transmitter coil of the wireless power transfer system, halting the wireless power transfer on the wireless power transfer system.

The method further comprises prior to enabling the wireless power transfer on the wireless power transfer system, performing a Q factor test to obtain a Q factor of the wireless power transfer system, comparing the Q factor to a predetermined Q factor reference, and determining whether a foreign object exists based on a comparison result from the step of comparing the Q factor to the predetermined Q factor reference.

The method further comprises prior to enabling the wireless power transfer on the wireless power transfer system, performing a power loss calibration based on the first relative position between the transmitter coil and the receiver coil of the wireless power transfer system, generating a first power loss curve based on the power loss calibration, and after enabling the wireless power transfer on the wireless power transfer system, calculating a power loss of the wireless power transfer system based on the first power loss curve, and determining whether a foreign object exists based on a comparison between a calculated power loss and a predetermined power loss reference.

The method further after enabling the wireless power transfer on the wireless power transfer system, performing the coupling factor test to measure a second coupling factor, comparing a difference between the second coupling factor and the first coupling factor with a predetermined reference, and determining the relative position change between the receiver coil and the transmitter coil based on a comparison result of the step of comparing the difference between the second coupling factor and the first coupling factor with the predetermined reference.

The method further comprises after finding the relative position change, performing a second calibration test based on the second relative position between the transmitter coil and the receiver coil.

An advantage of an embodiment of the present disclosure is that the foreign objection detection method is capable of accurately detecting a foreign object through adjusting a power loss calibration based on the relative position change between the transmitter coil and the receiver coil.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a method for detecting a foreign object in a wireless power transfer system. The present disclosure may also be applied, however, to a variety of energy transfer systems without wires as a physical link Hereinafter, various embodiments will be explained in detail with reference to the accompanying drawings.

Figure 1:
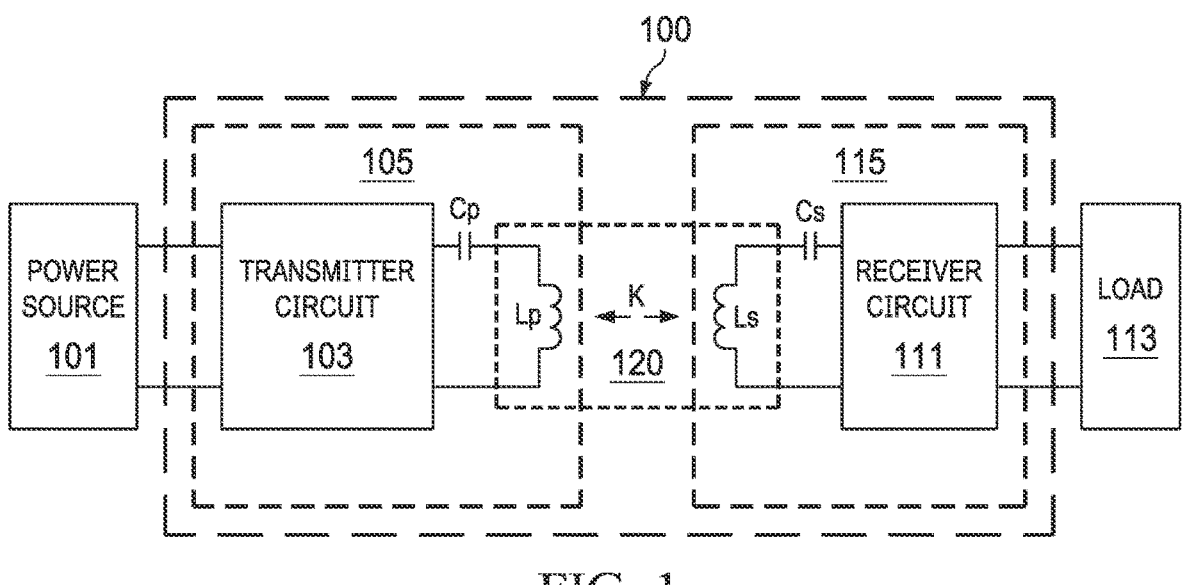
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 is connected between a power source 101 and a load 113. The wireless power transfer system 100 includes a transmitter 105 and a receiver 115. As shown in FIG. 1, the transmitter 105 comprises a transmitter circuit 103, a primary capacitor Cp and a primary coil Lp connected in cascade. Throughout the description, the primary coil Lp may be alternatively referred to as a transmitter coil. The input of the transmitter circuit 103 is connected to the power source 101. It should be noted that depending on different applications and design needs, a suitable power converter may be connected between the power source 101 and the transmitter circuit 103.

The receiver 115 comprises a secondary coil Ls, a secondary capacitor Cs and a receiver circuit 111. The secondary capacitor Cs and the receiver circuit 111 are connected in cascade between the secondary coil Ls and the load 113. As shown in FIG. 1, the output of the receiver circuit 111 is coupled to the load 113. Throughout the description, the secondary coil Ls may be alternatively referred to as a receiver coil.

The power transmitter 105 is magnetically coupled to the power receiver 115 through a magnetic field when the power receiver 115 is placed adjacent to the power transmitter 105. A loosely coupled transformer 120 is formed by the transmitter coil Lp, which is part of the power transmitter 105, and the receiver coil Ls, which is part of the power receiver 115. As a result, power may be transferred from the power transmitter 105 to the power receiver 115.

In some embodiments, the power transmitter 105 may be inside a charging pad. The transmitter coil is placed underneath the top surface of the charging pad. The power receiver 115 may be embedded in a mobile phone. When the mobile phone is place adjacent to the charging pad, a magnetic coupling may be established between the transmitter coil and the receiver coil. In other words, the transmitter coil and the receiver coil may form a loosely coupled transformer through which the power is transferred between the power transmitter 105 and the power receiver 115. The strength of coupling between the transmitter coil Lp and the receiver coil Ls is quantified by the coupling coefficient K.

In some embodiments, after the magnetic coupling has been established between the transmitter coil Lp and the receiver coil Ls, the power transmitter 105 and the power receiver 115 may form a power system through which power is wirelessly transferred from the power source 101 to the load 113.

The primary capacitor Cp functions as a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire. The secondary capacitor Cs functions a secondary resonant capacitor. The function of the secondary capacitor Cs is similar to that of the primary capacitor Cp, and hence is not discussed herein to avoid repetition. The primary capacitor Cp and the secondary capacitor Cs are employed to achieve soft switching, thereby improving the efficiency of the wireless power transfer system 100.

The power source 101 may be a power adapter converting a utility line voltage to a direct-current (DC) voltage. Alternatively, the power source 101 may be a renewable power source such as a solar panel array. Furthermore, the power source 101 may be an energy storage device such as rechargeable batteries, fuel cells and/or the like.

The load 113 represents the power consumed by the mobile device (e.g., a mobile phone) coupled to the power receiver 115. Alternatively, the load 113 may refer to a rechargeable battery and/or batteries connected in series/parallel, and coupled to the output of the power receiver 115.

The transmitter circuit 103 may comprise primary side switches of a full-bridge converter according to some embodiments. Alternatively, the transmitter circuit 103 may comprise the primary side switches of other converters such as a half-bridge converter, a push-pull converter and the like.

It should be noted that the converters described above are merely examples. One having ordinary skill in the art will recognize other suitable power converters such as class E topology based power converters (e.g., a class E amplifier), may alternatively be used.

In some embodiments, the receiver circuit 111 is implemented as a rectifier. Throughout the description, the receiver circuit 111 is alternatively referred to as a rectifier. The rectifier 111 converts an alternating polarity waveform received from the output of the receiver coil Ls to a single polarity waveform. In some embodiments, the rectifier 111 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 111 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 111 are well known in the art, and hence are not discussed herein.

Figure 2:
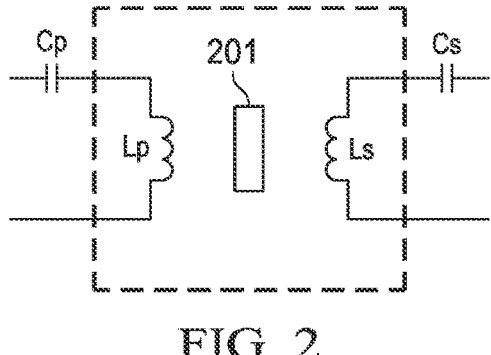
FIG. 2 illustrates a wireless power transfer system including an intended apparatus and an unintended apparatus in accordance with various embodiments of the present disclosure.

FIG. 2 illustrates a wireless power transfer system including an intended apparatus and an unintended apparatus in accordance with various embodiments of the present disclosure. A portion of the wireless power transfer system shown in FIG. 1 is employed to illustrate a wireless power transfer system including an intended apparatus (e.g., a power receiver) and an unintended apparatus (e.g., a coin placed between the power transmitter and the power receiver). As shown in FIG. 2, the wireless power transfer system comprises a primary coil Lp and a secondary coil Ls. The primary coil Lp is placed in a power transmitter of the wireless power transfer system. The secondary coil Ls is placed in a power receiver of the wireless power transfer system. The power transmitter is magnetically coupled to the power receiver through a magnetic field when the power receiver is placed near the power transmitter. As a result of having a magnetic coupling between the power transmitter and the power receiver, power may be transferred from the power transmitter to the power receiver.

In some embodiments, the primary coil Lp may be inside a charging pad. The primary coil Lp is placed underneath the top surface of the charging pad. The secondary coil Ls may be embedded in a mobile phone. When the mobile phone is place near the charging pad, a magnetic coupling may be established between the primary coil Lp and the secondary coil Ls. After the magnetic coupling has been established between the primary coil Lp and the secondary coil Ls, power is wirelessly transferred from the power transmitter to the power receiver.

In some embodiments, the secondary coil Ls is an intended apparatus configured to magnetically interact with the primary coil Lp. Depending on different operating conditions and applications, an unintended apparatus 201 may be placed between the primary coil Lp and the secondary coil Ls as shown in FIG. 2. The unintended apparatus 201 may be alternatively referred to as a foreign object. The foreign object 201 may be any suitable metal objects such as coins, paper clips, foils, any combinations thereof and the like.

The magnetic field between the primary coil Lp and the secondary coil Ls is not enclosed. The foreign object 201 is positioned on the interface surface of the power receiver, which is within or close to the charging area of the power receiver. The magnetic field may generate power signals within the foreign object 201. The power signals may cause a temperature rise due to eddy and/or induced currents that the power signal generates within the foreign object 201. FIG. 3-10 of the present disclosure illustrate a foreign object detection method.

Figure 3:
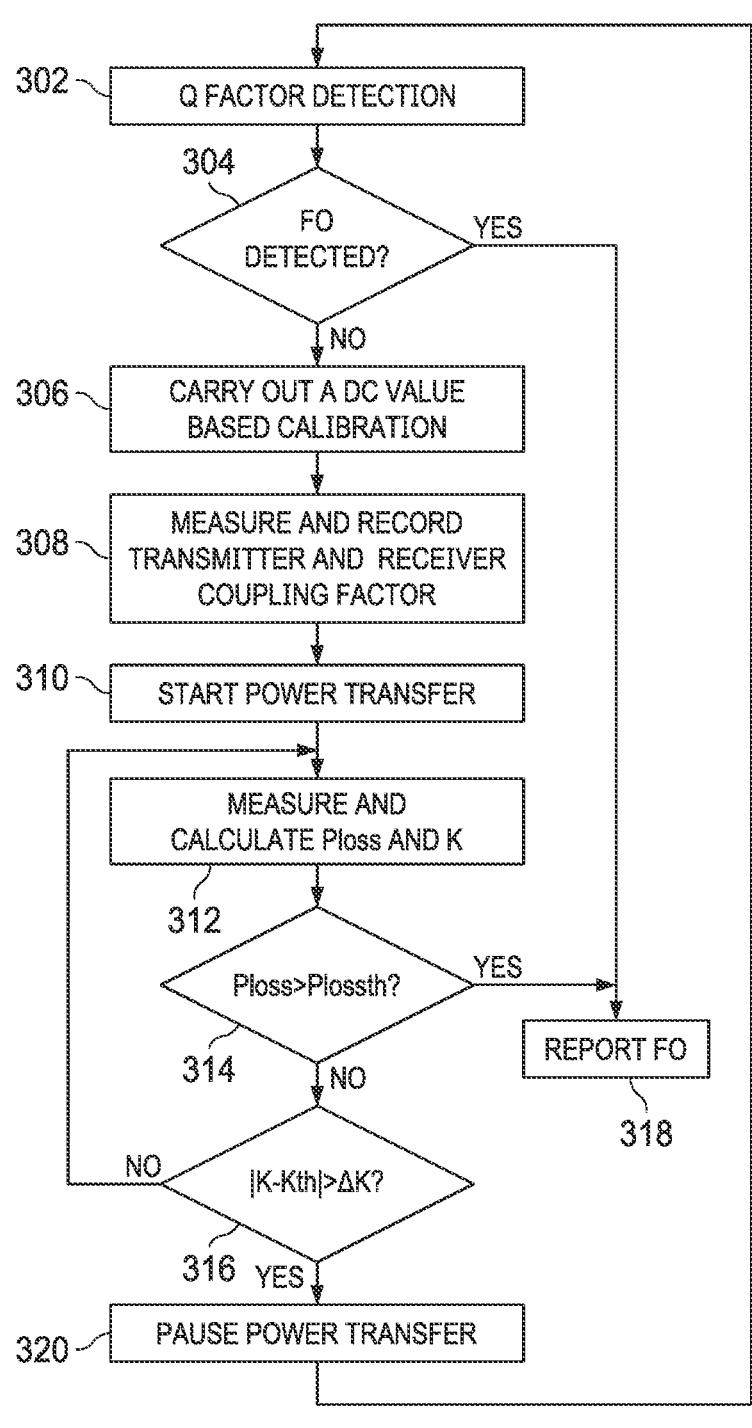
FIG. 3 illustrates a flow chart of a method for detecting a foreign object in the wireless power transfer system shown in FIG. 2 in accordance with various embodiments of the present disclosure.

FIG. 3 illustrates a flow chart of a method for detecting a foreign object in the wireless power transfer system shown in FIG. 2 in accordance with various embodiments of the present disclosure. This flowchart shown in FIG. 3 is merely an example, which should not unduly limit the scope of the claims. One of ordinary skill in the art would recognize many variations, alternatives, and modifications. For example, various steps illustrated in FIG. 3 may be added, removed, replaced, rearranged and repeated.

In a wireless power transfer system, the coil of the power transmitter is magnetically coupled to the coil of the power receiver. Any object that causes unexpected power losses is considered as a foreign object or an unintended object. The foreign object may be placed between the power transmitter and the power receiver. Alternatively, the foreign object may be placed adjacent to the power transmitter and/or the power receiver. The foreign object may be any suitable metal objects such as coins, paper clips, foils, any combinations thereof and the like.

Detecting a foreign object provides a safety mechanism if there is interference caused by the foreign object. In particular, when the foreign object is placed adjacent to the power transmitter and/or the power receiver, the magnetic field generated by the power transmitter may be coupled into the foreign object with undesired consequences. For example, the foreign object may be heated up to a high temperature in a few seconds. This high temperature rise may cause a reliability issue.

In order to prevent power delivery between the power transmitter and the power receiver when a foreign object is placed adjacent to the power transmitter and/or the power receiver, a foreign object detection method is employed as shown in FIG. 3.

At step 302, a small signal magnetic field is established to measure a quality (Q) factor of the wireless power transfer system. In particular, a small signal pulse is applied to the transmitter for measuring the Q factor of the wireless power transfer system. The small signal pulse is predetermined.

Depending on different applications and design needs, the amplitude of the small signal pulse may vary.

The Q factor of the wireless power transfer system is a ratio between the signal amplitude of the resonance across the primary coil and the input signal amplitude. The Q factor can be measured through a variety of methods. For example, the Q factor may be measured in a time domain through calculating a decay rate of the resonance across the primary coil. Alternatively, the Q factor may be measured in a frequency domain through calculating a ratio of the peak frequency to a system bandwidth.

The Q factor of the wireless power transfer system indicates whether a foreign object is placed adjacent to the power transmitter and/or the power receiver. For example, if the measured Q factor is less than a predetermined reference Q factor or there is a significant drop in the Q factor, a foreign object is placed adjacent to the power transmitter and/or the power receiver.

At step 304, a system controller determines whether a foreign object has been detected. As described above with respect to step 302, the foreign object can be detected through the Q factor test. If a foreign object has been detected, the method for detecting the foreign object proceeds to step 318 as shown in FIG. 3. At step 318, the system controller reports a detected foreign object to a user. As a result of having a foreign object, the power transfer between the power transmitter and the power receiver is interrupted or halted.

Also, at step 304, if a foreign object has not been detected, the method for detecting the foreign object proceeds to step 306 as shown FIG. 3. At step 306, a DC calibration is performed at a fixed location where the power receiver and the power transmitter are placed. In some embodiments, during the calibration, the receiver ramps up the power demand slowly. For example, the output power of the receiver is increased by a step of 1 W from 1 W to 15 W. In response to the power increase at the receiver, the input power of the transmitter increases accordingly. Both the output power of the receiver and the input power of the transmitter are recorded. Based on the measurements at different power levels, a power mapping between the input power of the transmitter and the output power of the receiver is generated. Since the calibration is a DC only calibration, the power loss (the difference between the input power of the transmitter and the output power of the receiver) can be accurately calculated. The power loss can be used to detect the foreign object after the power transfer between the power transmitter and the power receiver has been enabled. The power loss based foreign object detection will be described below with respect to step 314. After the DC calibration finishes, the method proceeds with step 308.

One advantageous feature of having a DC calibration performed at a fixed location is that after the power transfer starts, the power loss can be measured based on DC values. Such a DC value based measurement helps to achieve better accuracy. Furthermore, a detection coil is employed to detect any location change. More particularly, the detection coil is able to monitor the relative position change between the transmitter and the receiver continuously after the power transfer starts. Once a relative position change between the transmitter and the receiver occurs, the detection coil generates an output voltage proportional to the offset between the transmitter and the receiver. In response to this newly detected offset, the system controller will halt the power transfer. Then, the system controller will redo the DC calibration based on the new relative position between the transmitter and the receiver before resuming the power transfer between the transmitter and the receiver.

At step 308, a relative coupling between the power transmitter and the power receiver is calculated or measured. The relative coupling is the coupling factor (e.g., coupling coefficient) between the transmitter coil and the receiver coil. The relative coupling indicates the position of the power receiver relative to the power transmitter. The relative coupling is used to find whether a relative position change between the power receiver and the power transmitter exists after the power transfer starts. During the power transfer process, the system controller keeps monitoring the relative coupling. After a relative position change occurs, the system controller halts the power transfer. The system controller has to perform the foreign object test and redo the DC calibration based on the newly obtained offset between the transmitter and the receiver. Using the relative coupling to find a relative position change will be described below with respect to step 316. Also, at step 308, the relative coupling is recorded in the system memory. After step 308 finishes, the method proceeds with step 310 as shown in FIG. 3.

At step 310, the power transfer starts. Once power transfer is initiated, the wireless power transfer system constantly monitors the relative coupling between the power transmitter and the power receiver. When a change in the relative coupling is detected (mostly caused by a change in the relative position between the power transmitter and the power receiver), the wireless power transfer system will halt the power transfer and restart the Q factor detection (step 302) and the DC calibration (step 306) before resuming power transfer.

One advantageous feature of detecting the change in the relative coupling is that the calibration data used for the power loss calculation is always measured based on the current coupling relationship between the power transmitter and the power receiver. The power loss calculation based on the DC calibration is combined with coupling detection to ensure an accurate foreign object detection mechanism during high power transfer between the transmitter and the receiver. When a change in the relative coupling occurs, the DC calibration is no longer valid. A new DC calibration is triggered to ensure an accurate power loss calculation. Based on this accurate power loss calculation, the system controller is able to find the foreign object based on an increase of the power loss.

At step 312, the power flowing through the transmitter coil and the power received at the receiver coil are calculated based on a few power measurements on both the transmitter and receiver sides, and the difference is the power loss (Ploss). At the same time, the relative coupling (k) is calculated again.

At step 314, the power loss obtained at step 312 is compared with a predetermined power loss threshold. If the power loss is greater than the predetermined power loss threshold, the excessive Ploss means that some power losses are unaccounted for, and most likely a foreign object or some foreign objects have come into the field, and the foreign object is taking extra power and converts the extra power into heat.

As shown in FIG. 3, if the power loss (Ploss) is greater than the predetermined power loss threshold (Plossth), the method for detecting the foreign object proceeds to step 318. At step 318, the system controller reports a detected foreign object. As a result of having a foreign object, the power transfer between the power transmitter and the power receiver is interrupted or halted.

Also, at step 314, if a foreign object has not been detected, the method for detecting foreign objects proceeds to step 316 as shown in FIG. 3.

At step 316, the difference between the relative coupling obtained at step 312 and the relative coupling obtained at step 308 is compared with a predetermined threshold. If the difference between the relative coupling obtained at step 312 and the relative coupling obtained at step 308 is greater than the predetermined threshold, there is a relative position change between the power transmitter and the power receiver. In consideration with the relative position change, the method for detecting foreign objects proceeds to step 320 where the power transfer is halted. After halting the power transfer, the method for detecting foreign objects proceeds to step 302 where the method restarts the Q factor detection (step 302) and the DC calibration (step 306) before resuming the power transfer between the transmitter and the receiver.

Also, at step 316, if the difference between the relative coupling obtained at step 312 and the relative coupling obtained at step 308 is less than the predetermined threshold, a relative position change between the power transmitter and the power receiver does not occur. The method proceeds to step 312 as shown in FIG. 3.

Figures 4, 5:
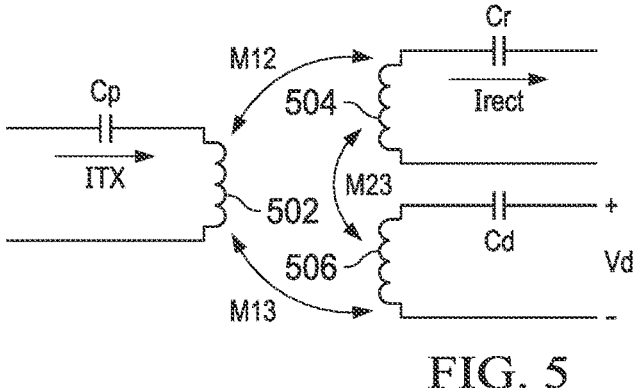
FIG. 4 illustrates a receiver coil and a detection coil in accordance with various embodiments of the present disclosure.
FIG. 5 illustrates the transmitter coil, the receiver coil, the detection coil and the magnetic couplings thereof in accordance with various embodiments of the present disclosure.

FIG. 4 illustrates a receiver coil and a detection coil in accordance with various embodiments of the present disclosure. The receiver coil 404 and the detection coil 406 are formed in a printed circuit board. The receiver coil 404 and the detection coil 406 are covered by a magnetic material layer 402. The magnetic material layer 402 may be formed of suitable magnetic materials such as ferrite and the like. The receiver coil 404 has twelve turns as shown in FIG. 4. The detection coil 406 has two turns.

As shown in FIG. 4, the detection coil 406 has a first turn having a first diameter and a second turn having a second diameter. The second diameter is greater than the first diameter. As shown in FIG. 4, the second turn is placed outside the receiver coil 404. The first turn is placed over the receiver coil 404.

In operation, when a current induced by the receiver coil flows through the detection coil, each turn of the detection coil will generate a magnetic flux. The direction of the magnetic flux in the first turn is opposite to the direction of the magnetic flux in the second turn with reference to the vertical axis which is perpendicular to the receiver coil. Since the magnetic flux from the first turn and the magnetic flux from the second turn tend to cancel each other out, the coupling between the detection coil and the receiver coil is almost equal to zero. In other words, the mutual inductance between the detection coil and the receiver coil is equal to zero. This feature ensures that the detected voltage generated by the detection coil 406 has almost zero dependency on the current flowing through the receiver coil 404. The detected voltage generated by the detection coil 406 only has dependency on the coupling between detection coil and the transmitter coil.

The detection coil 406 and the receiver coil 404 may be formed in at least two different layers of a printed circuit board (PCB). In some embodiments, the detection coil 406 and the receiver coil 404 may be formed in two layers immediately next to each other. In alternative embodiments, the detection coil 406 and the receiver coil 404 may be formed in two layers separated by a plurality of PCB layers. In some embodiments, the traces in these two PCB layers are connected together through suitable interconnect structures such as vias and the like.

FIG. 5 illustrates the transmitter coil, the receiver coil, the detection coil and the magnetic couplings thereof in accordance with various embodiments of the present disclosure. The wireless power transfer system comprises three coils, namely a transmitter coil 502, a receiver coil 504 and a detection coil 506 as shown in FIG. 5. The transmitter coil 502 is connected to a transmitter capacitor Cp as shown in FIG. 5. The receiver coil 504 is connected to a receiver capacitor Cr. The detection coil 506 is connected to a detection capacitor Cd. As shown in FIG. 5, the double-arrow connector between two coils denotes the magnetic coupling of these two coils. As shown in FIG. 5, the transmitter coil 502 is coupled to the receiver coil 504 with a coupling coefficient of M12. Likewise, the transmitter coil 502 is coupled to the detection coil 506 with a coupling coefficient of M13. The receiver coil 504 is coupled to the detection coil 506 with a coupling coefficient of M23.

As shown in FIG. 5, a transmitter current ITX flows through the transmitter capacitor Cp and the transmitter coil 502. After the magnetic field between the transmitter coil 502 and the receiver coil 504 has been established, a receiver current Irect flows through the receiver coil 504 and the receiver capacitor Cr. In addition, in response to the transmitter current ITX, an output voltage Vd is generated by the detection coil 506. In some embodiments, the detection coil 506 is designed such that the output voltage Vd is proportional to the relative position between the transmitter and the receiver. In other words, the output voltage Vd is proportion to the offset between the transmitter and the receiver. The output voltage Vd has no dependence on the current flowing through the receiver 504. The detailed operating principle of the detection coil will be described below with respect to FIGS. 6-8. In some embodiments, the output voltage Vd can be expressed as:

$$Vd = ITX \times 2\pi f \times M13$$

where ITX is the amplitude of the current flowing through the transmitter, and f is an operating frequency of the transmitter.

It should be noted that although the current flowing through the transmitter is used in the calculation above, the absolute accuracy of the current measurement is not critical. This is because only the relative measurement is used to determine if a recalibration is needed. As long as the coupling between the detection coil and the transmitter coil keeps a monotonic change, the absolute value of the transmitter current measurement could tolerate more error.

Figure 6:
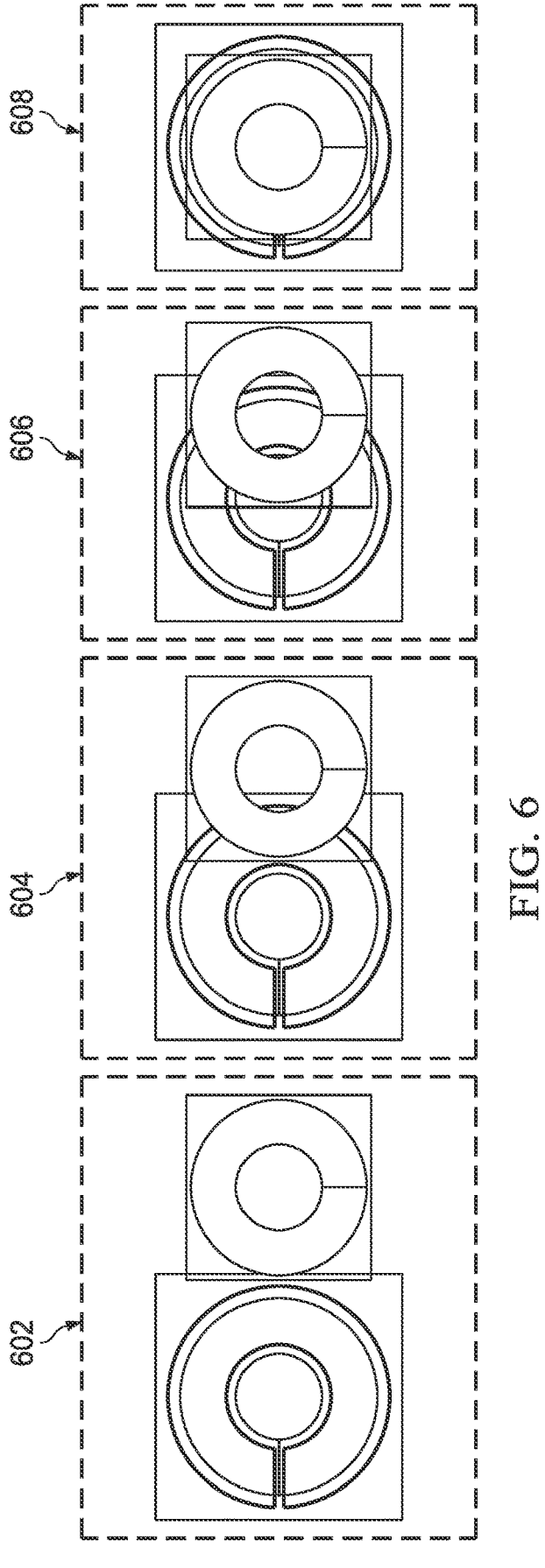
FIG. 6 illustrates a variety of relative positions between the transmitter coil and the receiver coil in accordance with various embodiments of the present disclosure.

FIG. 6 illustrates a variety of relative positions between the transmitter coil and the receiver coil in accordance with various embodiments of the present disclosure. Depending on different applications and design needs, the relative position between the transmitter coil and the receiver coil may vary. In a first embodiment 602, the transmitter coil is shifted away from the receiver coil. The edge of the transmitter coil is aligned with the edge of the receiver coil as shown in FIG. 6. In a second embodiment 604, the transmitter coil partially overlaps the receiver coil. The edge of the transmitter coil is aligned with the edge of the first turn of the detection coil as shown in FIG. 6. In a third embodiment 606, the transmitter coil partially overlaps the receiver coil. The edge of the transmitter coil is aligned with the center of the receiver coil as shown in FIG. 6. In a fourth embodiment 608, the transmitter coil is fully aligned with the receiver coil as shown in FIG. 6.

Figure 7:
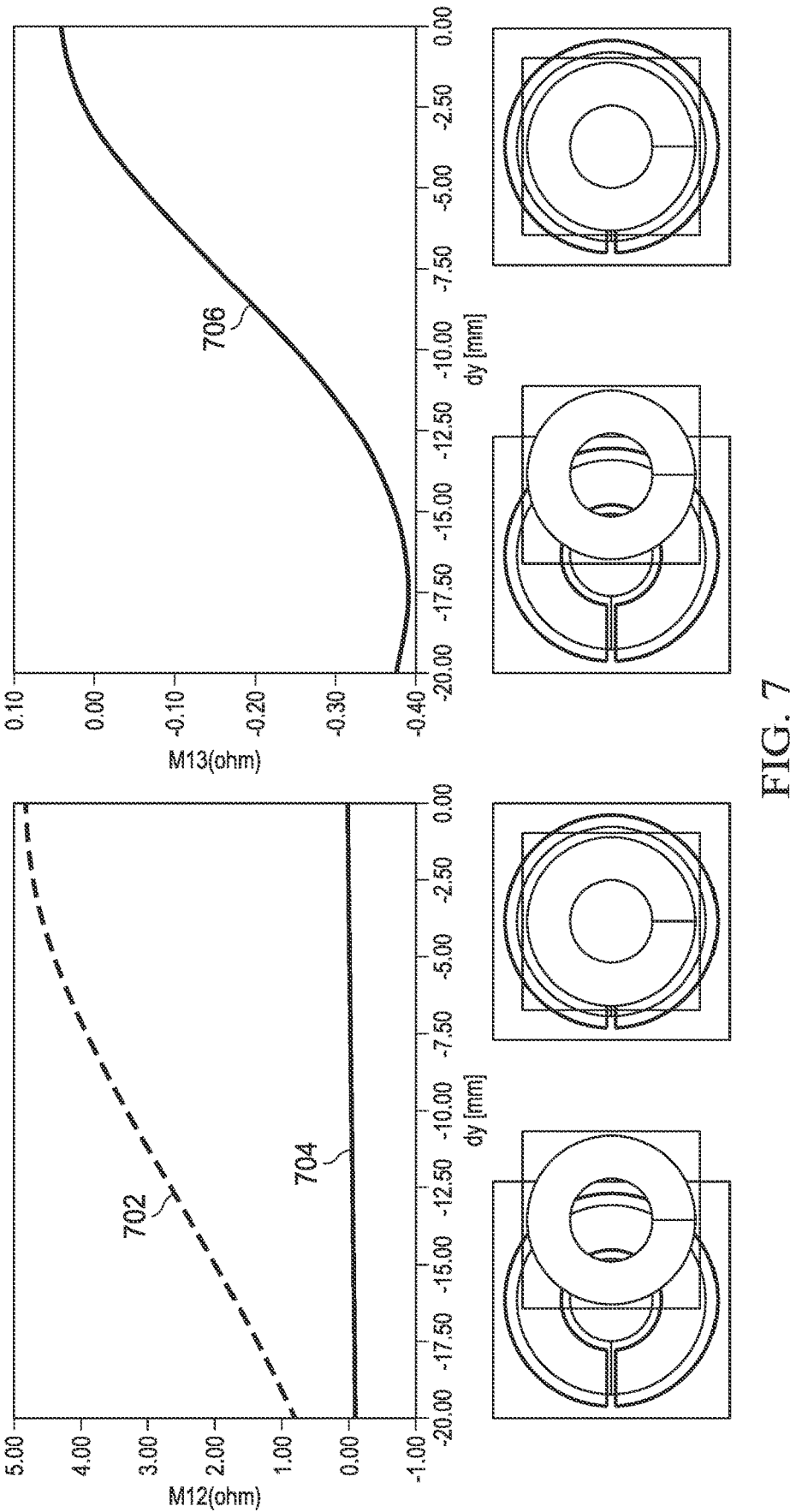
FIG. 7 illustrates the magnetic coupling waveforms of the transmitter coil, the receiver coil and the detection coil in accordance with various embodiments of the present disclosure.

FIG. 7 illustrates the magnetic coupling waveforms of the transmitter coil, the receiver coil and the detection coil in accordance with various embodiments of the present disclosure. The horizontal axis of FIG. 7 represents the position of the receiver coil relative to the transmitter coil. The unit of the horizontal axis is millimeter. At 0.0 of the horizontal axis, the offset between the transmitter coil and the receiver coil is equal to zero. In other words, the center of the transmitter coil is aligned with the center of the receiver coil. At −20.00 of the horizontal axis, the offset between the transmitter coil and the receiver coil is equal to 20 mm. The vertical axis of FIG. 7 represents the mutual inductance between different coils. The unit of the vertical axis is ohm.

FIG. 7 shows the relative position change between the receiver coil and the transmitter coil is in a range from 0 mm to 20 mm. In some embodiments, the offset range (the relative position change between the receiver coil and the transmitter coil) is in a range from 0 mm to about 10 mm A first Waveform 702 shows the mutual inductance between the transmitter coil and the receiver coil. In other words, waveform 702 indicates the magnetic coupling between the transmitter coil and the receiver coil under different offsets between the transmitter coil and the receiver coil. As shown in FIG. 7, in the range from 0 mm to about 10 mm, waveform 702 is a monotonic curve. In particular, waveform 702 decreases monotonically as the offset between the transmitter coil and the receiver coil increases.

Waveform 704 shows the mutual inductance between the receiver coil and the detection coil. In other words, waveform 704 indicates the magnetic coupling between the receiver coil and the detection coil under different offsets between the transmitter coil and the receiver coil. As shown in FIG. 7, in the range from 0 mm to about 10 mm, the mutual inductance between the receiver coil and the detection coil is approximately equal to zero. In other words, the magnetic coupling between the receiver coil and the detection coil is almost equal to zero.

Waveform 706 shows the mutual inductance between the transmitter coil and the detection coil. In other words, waveform 706 indicates the magnetic coupling between the transmitter coil and the detection coil under different offsets between the transmitter coil and the receiver coil. As shown in FIG. 7, in the range from 0 mm to about 10 mm, waveform 706 is a monotonic curve. In particular, waveform 706 decreases monotonically as the offset between the transmitter coil and the receiver coil increases.

The monotonic curve (e.g., waveform 706) ensures that the output voltage of the detection coil has almost zero dependency on the current flowing through the receiver coil, and only has dependency on the coupling between detection coil and the transmitter coil. Furthermore, the detection coil is also designed such that the output voltage of the detection coil has a linear relationship and a monotonic change with reference to the relative offset between the transmitter coil and the receiver coil.

It should be noted that the design of the detection coil can be further improved such that the mutual inductance between the transmitter coil and the detection coil is equal to zero when the transmitter coil is fully aligned with the receiver coil, and monotonically decreases as the offset between the transmitter coil and the receiver coil increases as shown in FIG. 7.

The output voltage of the detection coil can be measured by a suitable voltage detection apparatus. The detected voltage indicates the offset between the transmitter coil and the receiver coil.

Figure 8:
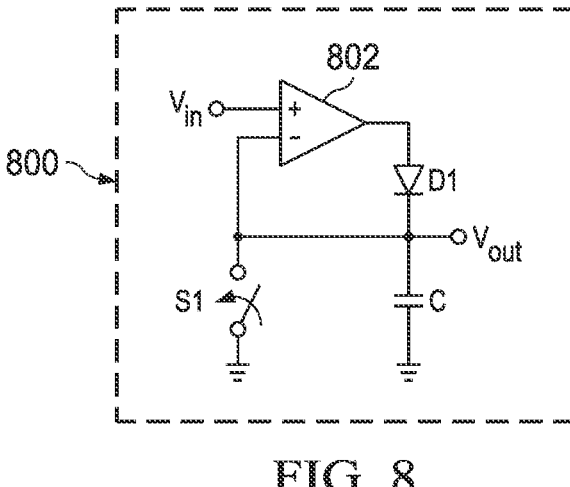
FIG. 8 illustrates a schematic diagram of a peak detector in accordance with various embodiments of the present disclosure.

FIG. 8 illustrates a schematic diagram of a peak detector in accordance with various embodiments of the present disclosure. The peak detector is employed to detect the output voltage of the detection coil. The peak detector 800 includes an operation amplifier 802, a diode D1, a capacitor C and a switch S1. The non-inverting input of the operation amplifier 802 is configured to be connected to a first output terminal of the detection coil. A second output terminal of the detection coil is connected to ground. The inverting input of the operation amplifier 802 is connected to the output Vout of the peak detector 800. The capacitor C functions as a holding capacitor. The diode D1 functions as a blocking diode. The switch S1 functions as a reset switch providing a discharge path for the holding capacitor.

In operation, the input voltage Vin is used to charge the holding capacitor. The holding capacitor is charged to the peak value of Vin. The diode D1 prevents the holding capacitor from being discharged. The output voltage of the detection coil is sampled by the peak detector 800. Based on the output of the peak detector 800, the system controller determines whether a relative position change between the transmitter coil and the receiver coil occurs. As described above with respect to step 316 of FIG. 3, the system controller may halt the power transfer between the transmitter and the receiver if the relative position change from the peak detector is greater than a predetermined threshold.

It should be noted that the peak detector shown in FIG. 8 is merely an example, which should not unduly limit the scope of the claims. One of ordinary skill in the art would recognize many variations, alternatives, and modifications. For example, the output voltage of the detection coil could also be rectified before sampling. Furthermore, the output voltage of the detection coil could be sampled directly by a high speed analog/digital converter in the system controller.

Figure 9:
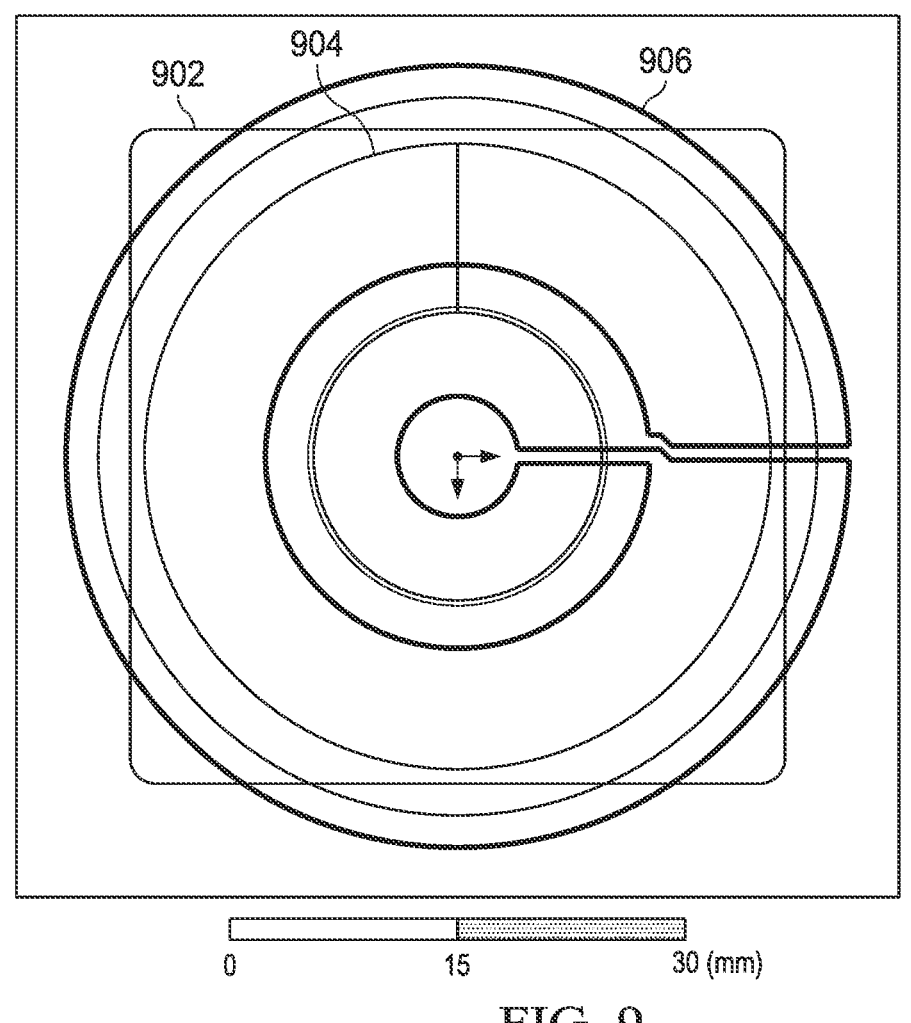
FIG. 9 illustrates another implementation of the receiver coil and the detection coil in accordance with various embodiments of the present disclosure.
Figure 10:
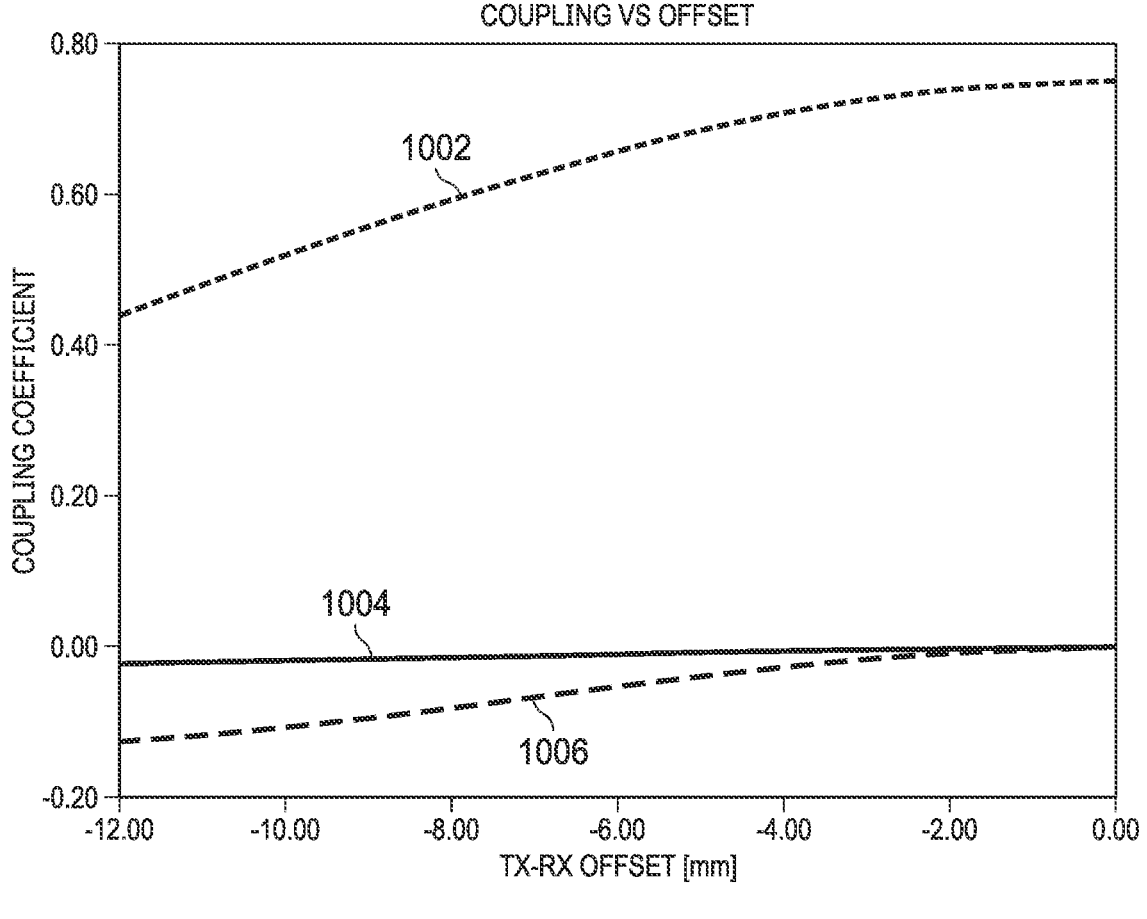
FIG. 10 illustrates magnetic coupling waveforms of the transmitter coil, the receiver coil and the detection coil in accordance with various embodiments of the present disclosure.

FIG. 9 illustrates another implementation of the receiver coil and the detection coil in accordance with various embodiments of the present disclosure. The magnetic material layer 902, the receiver coil 904 and the detection coil 906 are similar to the magnetic material layer 402, the receiver coil 404 and the detection coil 406 shown in FIG. 4 except that the detection coil 906 has three turns. The additional turn (a third turn) of the detection coil provides one more degree of freedom to allow more accurate coupling design. FIG. 10 below illustrates the advantage of having the third turn.

FIG. 10 illustrates magnetic coupling waveforms of the transmitter coil, the receiver coil and the detection coil in accordance with various embodiments of the present disclosure. The horizontal axis of FIG. 10 represents the position of the receiver coil relative to the transmitter coil. The unit of the horizontal axis is millimeter. At 0.0 of the horizontal axis, the offset between the transmitter coil and the receiver coil is equal to zero. In other words, the center of the transmitter coil is aligned with the center of the receiver coil. At −12.00 of the horizontal axis, the offset between the transmitter coil and the receiver coil is equal to 12 mm. In other words, the distance between the center of the transmitter coil and the center of the receiver coil is 12 mm. The vertical axis of FIG. 10 represents the coupling coefficient of different coils.

A first waveform 1002 represents the coupling coefficient between the transmitter coil and the receiver coil. As shown in FIG. 10, the coupling coefficient between the transmitter coil and the receiver coil decreases monotonically as the offset between the transmitter coil and the receiver coil increases. A second waveform 1004 represents the coupling coefficient between the detection coil and the receiver coil. As shown in FIG. 10, the coupling coefficient between the detection coil and the receiver coil is almost equal to zero. A third waveform 1006 represents the coupling coefficient between the transmitter coil and the detection coil. As shown in FIG. 10, the coupling coefficient between the transmitter coil and the detection coil decreases monotonically as the offset between the transmitter coil and the receiver coil increases.

The magnetic coupling waveforms shown in FIG. 10 are based on the detection coil shown in FIG. 9. After employing a detection coil having three turns, the magnetic coupling between the transmitter coil and the detection coil is very close to zero when the transmitter coil is fully aligned with the receiver coil. In addition, the magnetic coupling between the receiver coil and the detection coil is always close to zero in all offset conditions.

Although embodiments of the present disclosure and its advantages have been described in detail, it should be understood that various changes, substitutions and alterations can be made herein without departing from the spirit and scope of the disclosure as defined by the appended claims.

For example, in one embodiment an apparatus is disclosed that includes a receiver means configured to be magnetically coupled to a transmitter coil of a wireless power transfer system, and a detection means over the receiver means, the detection means having a first turn and a second turn, wherein a first magnetic flux through the first turn and a second magnetic flux through the second turn are opposite to each other, and wherein as a result of the first magnetic flux and the second magnetic flux opposite to each other, a magnetic coupling between the receiver means and the detection means is appropriately equal to zero.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method comprising:

performing a Q factor test to obtain a Q factor of a wireless power transfer system;

comparing the Q factor to a predetermined Q factor reference;

determining whether a foreign object exists based on a comparison result from the comparing the Q factor to the predetermined Q factor reference;

performing a power loss calibration on the wireless power transfer system;

after the Q factor test, enabling a wireless power transfer on the wireless power transfer system;

during the wireless power transfer, calculating a power loss of the wireless power transfer system based on the power loss calibration;

during the wireless power transfer, measuring a coupling factor between a transmitter coil and a receiver coil of the wireless power transfer system, wherein the coupling factor indicates a position of the receiver coil relative to the transmitter coil; and determining whether to continue the wireless power transfer of the wireless power transfer system based on the calculated power loss and the measured coupling factor, wherein the determining whether to continue the wireless power transfer of the wireless power transfer system based on the calculated power loss and the measured coupling factor comprises:

comparing the calculated power loss with a predetermined power loss threshold to obtain a power loss comparison result;

comparing the measured coupling factor with a predetermined coupling factor threshold to obtain a coupling factor comparison result; and determining whether to continue the wireless power transfer of the wireless power transfer system based on the power loss comparison result and the coupling factor comparison result.

2. The method of claim 1, further comprising:

prior to the comparing the measured coupling factor with the predetermined coupling factor threshold to obtain the coupling factor comparison result, comparing the calculated power loss with the predetermined power loss threshold to obtain the power loss comparison result, and determining that a second foreign object exists based on the power loss comparison result.

3. The method of claim 2, further comprising:

reporting, by a system controller, the foreign object upon determining that the foreign object exists in the wireless power transfer system.

4. The method of claim 2, further comprising:

after the comparing the measured coupling factor with the predetermined coupling factor threshold to obtain the coupling factor comparison result, halting the wireless power transfer after the coupling factor comparison result indicates a relative position change between the receiver coil and the transmitter coil.

5. The method of claim 1, further comprising:

detecting a relative position between the receiver coil and the transmitter coil using a detection coil, wherein the detection coil and the receiver coil are formed in a printed circuit board; and determining a magnetic coupling between the detection coil and the receiver coil in accordance with the relative position between the receiver coil and the transmitter coil.

6. The method of claim 5, wherein the magnetic coupling between the detection coil and the receiver coil is approximately equal to zero.

7. The method of claim 5, wherein the magnetic coupling between the detection coil and the transmitter coil exhibits a monotonic curve in response to different offsets between the transmitter coil and the receiver coil.

8. A method comprising:

performing a Q factor test to obtain a Q factor of a wireless power transfer system;

comparing the Q factor to a predetermined Q factor reference;

determining whether a foreign object exists based on a comparison result from the comparing the Q factor to the predetermined Q factor reference;

performing a coupling factor test to measure a first coupling factor representing a first relative position between a transmitter coil and a receiver coil of the wireless power transfer system;

after the Q factor test, enabling a wireless power transfer on the wireless power transfer system;

during the wireless power transfer, performing the coupling factor test to measure a second relative position between the receiver coil and the transmitter coil of the wireless power transfer system;

determining whether to continue the wireless power transfer of the wireless power transfer system based on a power loss and the measured second relative position, wherein the determining whether to continue the wireless power transfer of the wireless power transfer system based on the power loss and the measured second relative position comprises:

comparing the power loss with a predetermined power loss threshold to obtain a power loss comparison result;

obtaining a coupling factor comparison result based on the measured second relative position and a predetermined coupling factor threshold; and determining whether to continue the wireless power transfer of the wireless power transfer system based on the power loss comparison result and the coupling factor comparison result; and after finding a relative position change between the receiver coil and the transmitter coil of the wireless power transfer system, halting the wireless power transfer on the wireless power transfer system.

9. The method of claim 8, further comprising:

prior to the enabling the wireless power transfer on the wireless power transfer system, performing a power loss calibration based on the first relative position between the transmitter coil and the receiver coil of the wireless power transfer system;

generating a first power loss curve based on the power loss calibration; and after enabling the wireless power transfer on the wireless power transfer system, calculating the power loss of the wireless power transfer system based on the first power loss curve, and determining whether a second foreign object exists based on a comparison between the power loss and a predetermined power loss reference.

10. The method of claim 8, further comprising:

after the enabling the wireless power transfer on the wireless power transfer system, performing the coupling factor test to measure a second coupling factor;

comparing a difference between the second coupling factor and the first coupling factor with a predetermined reference; and determining the relative position change between the receiver coil and the transmitter coil based on a comparison result of the comparing the difference between the second coupling factor and the first coupling factor with the predetermined reference.

11. The method of claim 10, further comprising:

after the finding the relative position change, performing a second calibration test based on the second relative position between the transmitter coil and the receiver coil.

12. The method of claim 8, further comprising:

performing the coupling factor test through a detection coil formed over the receiver coil, wherein a magnetic coupling between the receiver coil and the detection coil is approximately equal to zero.

13. The method of claim 12, wherein:

the receiver coil has a plurality of turns; and the detection coil has two turns, and wherein the detection coil and the receiver coil have a same center.

14. A method comprising:

performing a Q factor test to obtain a Q factor of a wireless power transfer system;

comparing the Q factor to a predetermined Q factor reference;

determining whether a foreign object exists based on a comparison result from the comparing the Q factor to the predetermined Q factor reference;

performing a power loss calibration on the wireless power transfer system;

performing a coupling factor test to measure a first coupling factor representing a first relative position between a transmitter coil and a receiver coil of the wireless power transfer system;

after the Q factor test, enabling a wireless power transfer on the wireless power transfer system;

calculating a power loss of the wireless power transfer system based on the power loss calibration;

during the wireless power transfer, measuring a second coupling factor between the transmitter coil and the receiver coil of the wireless power transfer system, the measuring comprising:

performing the coupling factor test to measure a second relative position between the receiver coil and the transmitter coil of the wireless power transfer system;

determining whether to continue the wireless power transfer of the wireless power transfer system based on the calculated power loss and the measured second coupling factor, wherein the determining whether to continue the wireless power transfer of the wireless power transfer system based on the calculated power loss and the measured second coupling factor comprises:

comparing the calculated power loss with a predetermined power loss threshold to obtain a power loss comparison result;

comparing the measured second coupling factor with a predetermined coupling factor threshold to obtain a coupling factor comparison result; and determining whether to continue the wireless power transfer of the wireless power transfer system based on the power loss comparison result and the coupling factor comparison result; and after finding a relative position change between the receiver coil and the transmitter coil of the wireless power transfer system, halting the wireless power transfer on the wireless power transfer system.

15. The method of claim 14, further comprising:

reporting, by a system controller, the foreign object upon determining that the foreign object exists in the wireless power transfer system.

* * * * *